(12) United States Patent
Zhang

(10) Patent No.: US 12,149,820 B2
(45) Date of Patent: Nov. 19, 2024

(54) ELECTRIC QUANTITY INDICATING METHOD AND ELECTRONIC DEVICE

(71) Applicant: VIVO MOBILE COMMUNICATION CO., LTD., Dongguan (CN)

(72) Inventor: Yongfa Zhang, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 0 days.

(21) Appl. No.: 17/954,315

(22) Filed: Sep. 27, 2022

(65) Prior Publication Data

US 2023/0017912 A1   Jan. 19, 2023

Related U.S. Application Data

(63) Continuation of application No. PCT/CN2021/083583, filed on Mar. 29, 2021.

(30) Foreign Application Priority Data

Mar. 31, 2020  (CN) .......................... 202010245832.5

(51) Int. Cl.
*H04N 23/65* (2023.01)
*G06F 1/28* (2006.01)
(Continued)

(52) U.S. Cl.
CPC .............. *H04N 23/65* (2023.01); *G06F 1/28* (2013.01); *H04M 1/0264* (2013.01); *H04N 23/531* (2023.01)

(58) Field of Classification Search
CPC ........ H04N 23/50; H04N 23/51; H04N 23/57; H04N 23/63633; H04N 23/634; H04N 23/65; H04N 23/651; H04M 1/0264
(Continued)

(56) References Cited

U.S. PATENT DOCUMENTS 7,957,765 B1 * 6/2011 Causey ............... H04M 1/0256
455/556.1
2016/0212327 A1 * 7/2016 Dietel .................... H04N 23/63
(Continued)

FOREIGN PATENT DOCUMENTS

CN       102832978 A    12/2012
CN       104320585 A     1/2015
(Continued)

OTHER PUBLICATIONS

International Search Report issued in corresponding International Application No. PCT/CN2021/083583, mailed Jun. 24, 2021, 6 pages.
(Continued)

*Primary Examiner* — Anthony J Daniels
(74) *Attorney, Agent, or Firm* — IPX PLLC

(57) ABSTRACT

An electric quantity indicating method and an electronic device are provided. The method is performed by an electronic device. The electronic device includes a device body and a detachable camera module. The method includes: receiving first information sent by the detachable camera module, where the first information includes electric quantity information of the power supply of the detachable
(Continued)

camera module; and according to the first information, displaying a target identifier on the device body; where the target identifier is an electric quantity identifier of the power supply of the detachable camera module in the electronic device.

15 Claims, 5 Drawing Sheets

(51) Int. Cl.
  *H04M 1/02* (2006.01)
  *H04N 23/53* (2023.01)
(58) Field of Classification Search
  USPC ..................................................... 348/207.1
  See application file for complete search history.

(56) References Cited

U.S. PATENT DOCUMENTS

| | | | |
|---|---|---|---|
| 2016/0301814 A1 | 10/2016 | Sato et al. | |
| 2017/0041516 A1* | 2/2017 | Oliveira | H04N 23/69 |
| 2017/0115713 A1 | 4/2017 | Shin et al. | |
| 2017/0318165 A1* | 11/2017 | Ogata | G03B 17/48 |
| 2019/0052794 A1* | 2/2019 | Kikuchi | H04N 23/63 |
| 2019/0228505 A1* | 7/2019 | Douady-Pleven | H04N 23/80 |
| 2019/0342504 A1* | 11/2019 | Mori | H02J 7/00 |

FOREIGN PATENT DOCUMENTS

| | | |
|---|---|---|
| CN | 104333625 A | 2/2015 |
| CN | 205945949 U | 2/2017 |
| CN | 108632470 A | 10/2018 |
| CN | 108696688 A | 10/2018 |
| CN | 109862504 A | 6/2019 |
| CN | 110267145 A | 9/2019 |
| CN | 209731326 U | 12/2019 |
| CN | 111464737 A | 7/2020 |
| JP | 2001235789 A | 8/2001 |
| JP | 2000252144 A | 9/2020 |
| WO | 2021121180 A1 | 6/2021 |

OTHER PUBLICATIONS

First Office Action issued in related Chinese Application No. 202010245832.5, mailed Feb. 2, 2021, 6 pages.
Second Office Action issued in related Chinese Application No. 202010245832.5, mailed Jul. 16, 2021, 7 pages.
Extended European Search Report issued in related European Application No. 21779665.5, mailed Aug. 2, 2023, 21 pages.

* cited by examiner

ELECTRIC QUANTITY INDICATING METHOD AND ELECTRONIC DEVICE

CROSS-REFERENCE TO RELATED APPLICATIONS

This application is a continuation of International Application No. PCT/CN2021/083583, filed Mar. 29, 2021, which claims priority to Chinese Patent Application No. 202010245832.5, filed Mar. 31, 2020. The entire contents of each of the above-referenced applications are expressly incorporated herein by reference.

TECHNICAL FIELD

The present disclosure relates to the field of communications technologies, and in particular, to an electric quantity indicating method and an electronic device.

BACKGROUND

With the rapid development of communications technologies, terminal devices are increasingly widely used, and users have increasingly high requirements on the performance of terminal devices.

At present, the screen ratios of electronic devices can be increased by installing detachable camera modules. For example, a detachable camera module can be installed on the back surface or side surface of an electronic device to replace the original front camera module, thereby increasing the screen ratio of the electronic device. Usually, the detachable camera module has an independent power supply, and the power supply can supply power to the detachable camera module.

However, since the power supply of the detachable camera module is independent, during the operation of the detachable camera module, the electronic device cannot monitor an electric quantity of the power supply of the detachable camera module, thus affecting the usage of the detachable camera module.

SUMMARY

Embodiments of the present disclosure provide an electric quantity indicating method and an electronic device.

According to a first aspect, an embodiment of the present disclosure provides an electric quantity indicating method. The method is performed by a first electronic device. The first electronic device includes a device body and a detachable camera module. The method includes: receiving first information sent by the detachable camera module, where the first information includes electric quantity information of the power supply of the detachable camera module, and the detachable camera module is a camera module of the first electronic device; and according to the first information, displaying a target identifier on the device body; where the target identifier is an electric quantity identifier of the power supply of the detachable camera module in the first electronic device.

According to a second aspect, an embodiment of the present disclosure provides a first electronic device, the first electronic device includes a device body and a detachable camera module, and the first electronic device includes a receiving module and a display module. The receiving module is configured to receive first information sent by the detachable camera module, where the first information includes electric quantity information of the power supply of the detachable camera module; and the display module is configured to: according to the first information received by the receiving module, display a target identifier on the device body; where the target identifier is an electric quantity identifier of the power supply of the detachable camera module in the first electronic device.

According to a third aspect, an embodiment of the present disclosure provides an electronic device, where the electronic device includes: a processor, a memory, and a computer program that is stored in the memory and that can run on the processor, where when the computer program is executed by the processor, the steps of the electric quantity indicating method according to the first aspect are implemented.

According to a fourth aspect, an embodiment of the present disclosure provides a computer-readable storage medium. The computer-readable storage medium stores a computer program, and when the computer program is executed by a processor, the steps of the electric quantity indicating method according to the first aspect are implemented.

According to a fifth aspect, an embodiment of the present disclosure further provides a computer program product, where when the computer program product is executed by at least one processor, the electric quantity indicating method is implemented.

According to a sixth aspect, an embodiment of the present disclosure further provides an electronic device, configured to execute the electric quantity indicating method.

In the embodiments of the present disclosure, the first electronic device may receive the first information (including the electric quantity information of the power supply of the detachable camera module) sent by the detachable camera module of the first electronic device; and according to the first information, display the target identifier (in the first electronic device, the electric quantity identifier of the power supply of the detachable camera module) on the device body of the first electronic device. Through this solution, on the one hand, since the first information includes the electric quantity information of the power supply of the detachable camera module, after the first electronic device receives the first information, the first electronic device can accurately indicate the electric quantity of the power supply of the detachable camera module based on the target identifier according to the first information, so that the usage of the power supply of the detachable camera module can be accurately monitored. On the other hand, since the first electronic device can receive in real time the first information sent by the detachable camera module, the first electronic device can monitor the usage of the power supply of the detachable camera module in real time, so as to effectively monitor in real time the power supply of the detachable camera module.

DETAILED DESCRIPTION

Figure 1:
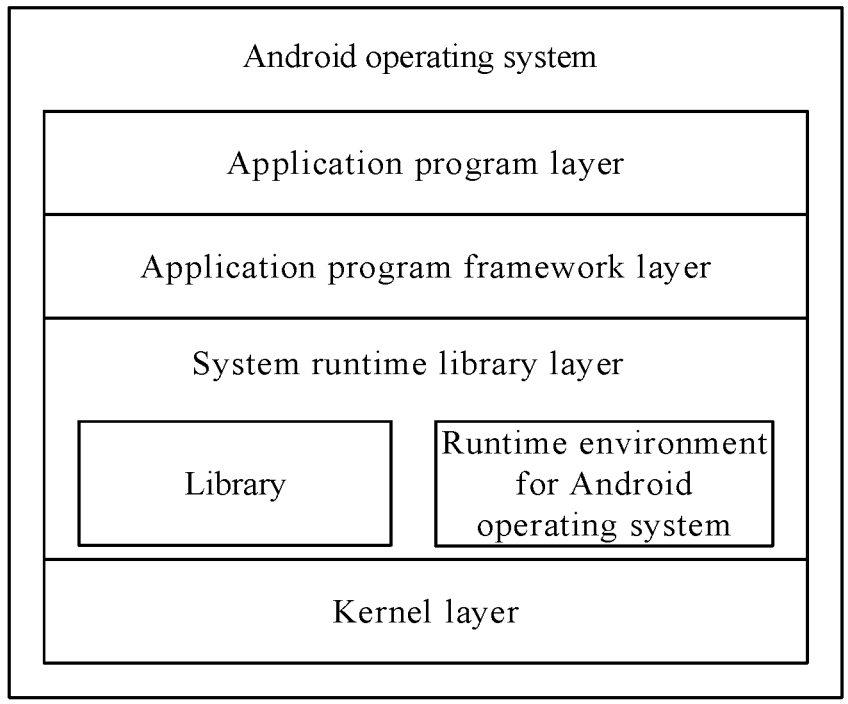
FIG. 1 is a schematic architectural diagram of an Android operating system according to an embodiment of the present disclosure.

The following describes the technical solutions in the embodiments of the present disclosure with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure without creative efforts shall fall within the protection scope of the present disclosure.

The term "and/or" in this specification describes an association relationship of associated objects, indicating that three relationships may exist. For example, A and/or B may indicate three cases: Only A exists, both A and B exist, and only B exists. A character "/" in this specification indicates an "or" relationship between associated objects. For example, A/B indicates A or B.

In the specification and claims of the present disclosure, the terms such as "first" and "second" are used to distinguish between different objects, but are not used to describe a particular sequence of the objects. For example, first information and second information are used to distinguish between different information, and are not used to describe a specific sequence of information.

In the embodiments of the present disclosure, the term such as "exemplary" or "for example" is used to represent an example, an instance, or a description. Any embodiment or design solution described as "exemplary" or "an example" in the embodiments of the present disclosure should not be construed as being more preferred or advantageous than other embodiments or design solutions. To be precise, the use of the term "exemplary", "for example", or the like is intended to present a related concept in a specific manner.

In the description of the embodiments of the present disclosure, unless otherwise specified, the meaning of "a plurality of" means two or more. For example, a plurality of elements mean two or more elements.

Embodiments of the present disclosure provide an electric quantity indicating method and an electronic device, and the first electronic device may receive the first information (including the electric quantity information of the power supply of the detachable camera module) sent by the detachable camera module of the first electronic device; and according to the first information, display the target identifier (in the first electronic device, the electric quantity identifier of the power supply of the detachable camera module) on the device body of the first electronic device. Through this solution, on the one hand, since the first information includes the electric quantity information of the power supply of the detachable camera module, after the first electronic device receives the first information, the first electronic device can accurately indicate the electric quantity of the power supply of the detachable camera module based on the target identifier according to the first information, so that the usage of the power supply of the detachable camera module can be accurately monitored. On the other hand, since the first electronic device can receive in real time the first information sent by the detachable camera module, the first electronic device can monitor the usage of the power supply of the detachable camera module in real time, so as to effectively monitor in real time the power supply of the detachable camera module.

The electric quantity indicating method, the electronic device, and the camera module provided by the embodiments of the present disclosure can be performed by a process in which the electronic device (the first electronic device in the embodiments of the present disclosure) obtains and displays electric quantity information of a detachable camera module (such as a first user in the embodiments of the present disclosure).

The electronic device (including the first electronic device and the second electronic device) in the embodiment of the present disclosure may be an electronic device having an operating system. The operating system may be an Android operating system, or may be an iOS operating system, or other possible operating systems, which is not limited in the embodiments of the present disclosure.

The following takes the Android operating system as an example to introduce a software environment to which the electric quantity indicating method provided by the embodiments of the present disclosure is applied.

FIG. 1 is a schematic architectural diagram of a possible Android operating system according to an embodiment of the present disclosure. In FIG. 1, an architecture of the Android operating system includes four layers: an application program layer, an application program framework layer, a system runtime library layer, and a kernel layer (which may be a Linux kernel layer).

The application program layer includes various application programs (including a system application program and a third-party application program) in the Android operating system.

The application program framework layer is an application program framework, and a developer may develop some application programs based on the application program framework layer while conforming to a rule for developing the application program framework.

The system runtime library layer includes a library (also referred to as a system library) and an Android operating system runtime environment. The library mainly provides the Android operating system with various resources required by the Android operating system. The runtime environment for the Android operating system is used to provide the Android operating system with a software environment.

The kernel layer is an operating system layer of the Android operating system, and is the lowest layer of software levels of the Android operating system. The kernel layer provides the Android operating system with a core system service and a hardware-related driver based on the Linux kernel.

The Android operating system is used as an example. In the embodiments of the present disclosure, based on the system architecture of the Android operating system shown in FIG. 1, developers may develop a software program that implements the electric quantity indicating method provided in the embodiments of the present disclosure, so that the electric quantity indicating method may be performed based on the Android operating system shown in FIG. 1. That is, a processor or the electronic device may run the software program in the Android operating system to implement the electric quantity indicating method provided in the embodiments of the present disclosure.

The electronic device in the embodiments of the present disclosure may be a mobile terminal or a non-mobile terminal. For example, the mobile terminal may be a mobile phone, a tablet computer, a laptop computer, a palmtop computer, an in-vehicle terminal, a wearable device, an ultra-mobile personal computer (UMPC), a netbook, or a personal digital assistant (PDA). The non-mobile terminal may be a personal computer (PC), a television (TV), an automated teller machine, or a self-service machine. This is not limited in the embodiments of the present disclosure.

The electric quantity indicating method provided in the embodiments of the present disclosure may be performed by the electronic device (the first electronic device in the embodiments of the present disclosure) or a functional module and/or a functional entity that can implement the electric quantity indicating method in the electronic device. This may be determined according to an actual use requirement, and is not limited in the embodiments of the present disclosure. Taking the electronic device as an example, the following exemplarily describes the electric quantity indicating method provided in the embodiments of the present disclosure.

In the embodiments of the present disclosure, for an electronic device including a detachable camera module (for example, the first electronic device in the embodiments of the present disclosure), the detachable camera module of the first electronic device may send electric quantity information of the power supply of the detachable camera module to the first electronic device. Then, the first electronic device can display the electric quantity identifier (for example, the target identifier in the embodiments of the present disclosure) of the power supply of the detachable camera module on the device body of the first electronic device according to the information, so as to accurately indicate the electric quantity of the detachable camera module.

In the following, the electric quantity indicating method provided by the embodiments of the present disclosure will be exemplarily described with reference to the accompanying drawings.

Figure 2:
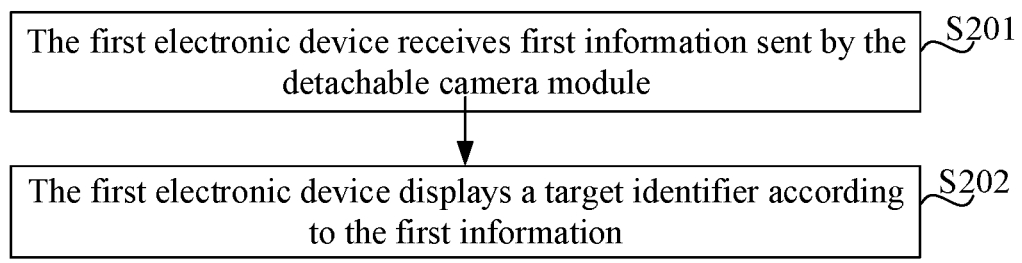
FIG. 2 is a schematic flowchart of an electric quantity indicating method according to an embodiment of the present disclosure.

As shown in FIG. 2, an embodiment of the present disclosure provides an electric quantity indicating method. The method is performed by a first electronic device. The first electronic device may include a device body and a detachable camera module. The method may include the following S201 and S202.

It should be noted that, in the embodiments of the present disclosure, the device body of the first electronic device may be other components other than the detachable camera module, for example, including components such as a processor, a memory, and a display.

It can be understood that, in the embodiments of the present disclosure, the detachable camera module and the device body may form the first electronic device in the embodiments of the present disclosure, that is, the detachable camera module and the device body are matched.

S201. The first electronic device receives first information sent by the detachable camera module.

The first information may include electric quantity information of the power supply of the detachable camera module.

S202. The first electronic device displays a target identifier according to the first information.

The target identifier may be an identifier indicating a current electric quantity of the power supply of the detachable camera module in the first electronic device.

In the embodiments of the present disclosure, the detachable camera module may send the first information to the first electronic device, and after the first electronic device receives the first information, the first electronic device may display the target identifier according to the first information.

In the embodiments of the present disclosure, the first electronic device receives the first information, and the device body of the first electronic device receives the first information from the detachable camera module. The device body can maintain a communication connection with the detachable camera module.

In the embodiments of the present disclosure, in a possible implementation manner, the first information may be the electric quantity information of the power supply of the detachable camera module.

In the embodiments of the present disclosure, in another possible implementation manner, the first information may include information other than the electric quantity information of the power supply of the detachable camera module. For example, the first information may carry electric quantity information of the power supply of the detachable camera module.

In the embodiments of the present disclosure, the electric quantity information of power supply of the detachable camera module may be electric quantity information of the current remaining electric quantity of power supply of the detachable camera module, or electric quantity information of the current electricity consumption of power supply of the detachable camera module relative to the total electric quantity of power supply of the detachable camera module.

In actual implementation, the electric quantity information of the power supply of the detachable camera module may also include any other possible information, which may be determined according to actual usage requirements and is not limited in the embodiments of the present disclosure.

In the embodiments of the present disclosure, the electric quantity information of the current remaining electric quantity of power supply of the detachable camera module may be the electric quantity value of the current remaining electric quantity of power supply of the detachable camera module, or may be an electric quantity percentage of the current remaining electric quantity of the power supply of the detachable camera module. This may be determined according to an actual usage requirement, and is not limited in the embodiments of the present disclosure.

Correspondingly, the electric quantity information of the current electricity consumption of power supply of the detachable camera module may be the electric quantity value of the current electricity consumption of power supply of the detachable camera module, or may be an electric quantity percentage of the current electricity consumption of power supply of the detachable camera module. This may be determined according to an actual usage requirement, and is not limited in the embodiments of the present disclosure.

In the embodiments of the present disclosure, the first electronic device may store information on the rated electric quantity of power supply of the detachable camera module, and after the first electronic device receives the first information, the first electronic device may determine the current remaining electric quantity of the power supply of the detachable camera module according to the information on the rated electric quantity and the first information, so that the target identifier can be displayed on the device body according to the remaining electric quantity.

In the embodiments of the present disclosure, the target identifier may be a symbol identifier (for example, a battery symbol identifier or a digital symbol identifier), or an image identifier (for example, a film identifier).

In an implementation, the target identifier may also be any other possible identifier, which may be determined according to actual usage requirements and is not limited in the embodiments of the present disclosure.

In the embodiments of the present disclosure, when the target identifier is a film identifier, the first electronic device can indicate the current remaining electric quantity of the power supply of the detachable camera module by using the length of the displayed film identifier (the number of film segments of the film identifier).

In some embodiments, more film segments of the film identifier displayed on the device body indicate a larger current remaining electric quantity of the power supply of the detachable camera module.

Figure 3:
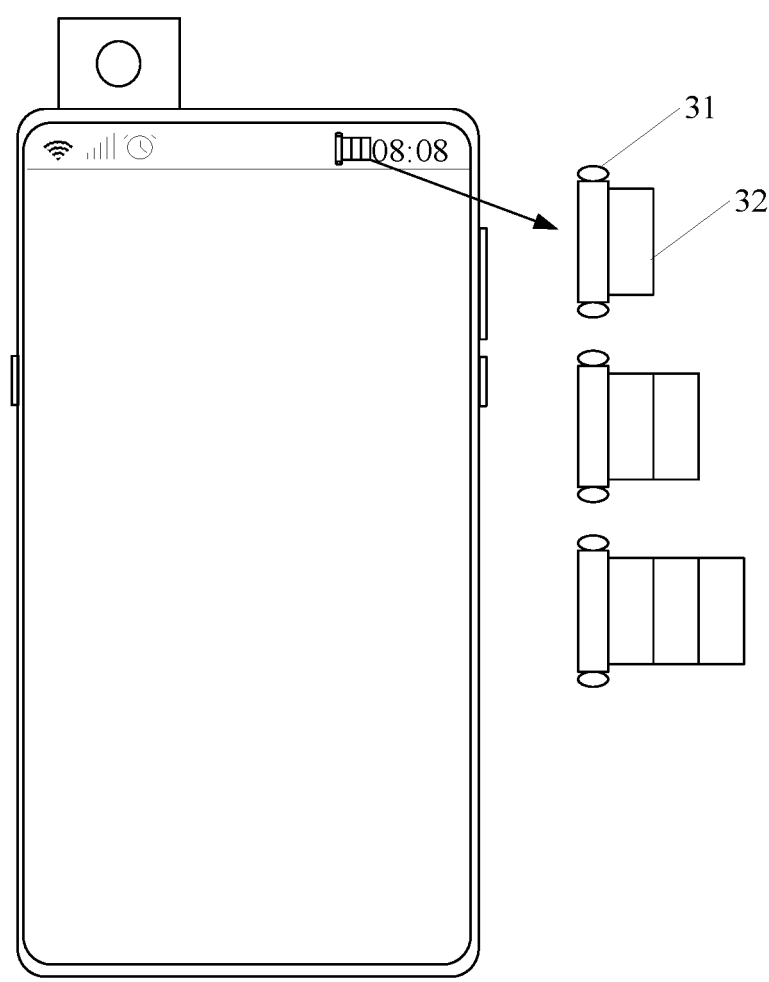
FIG. 3 is a schematic diagram 1 of an interface of the application of an electric quantity indicating method according to an embodiment of the present disclosure.

Exemplarily, as shown in FIG. 3, it is assumed that the target identifier is a film identifier. When the film identifier displayed by the first electronic device on the device body includes 3 films, it can indicate that the current remaining electric quantity of power supply of the detachable camera module is full (that is, electricity of the power supply of the detachable camera module is not consumed). Then, the films decrease in sequence. Fewer film segments included in the film identifier indicate that more electricity of the power supply of the detachable camera module is consumed, that is, less electricity of the power supply of the detachable camera module remains.

In the embodiments of the present disclosure, when the electricity of power supply of the detachable camera module is exhausted (that is, the current remaining electric quantity of power supply of the detachable camera module is zero), the first electronic device may display the target identifier in the form of a film scroll on the device body without displaying any film, so that the user can be informed that the power supply of the detachable camera module is exhausted.

In the embodiments of the present disclosure, since the film identifier is relatively vivid and intuitive, the current remaining electric quantity of the detachable camera module can be indicated concisely through the film identifier.

In the embodiments of the present disclosure, the first electronic device may display the target identifier on the task bar of the device body, or on the desktop of the device body (for example, displayed on the desktop of the device body in the form of a desktop pendant). This may be determined according to an actual usage requirement, and is not limited in the embodiments of the present disclosure.

Exemplarily, as shown in FIG. 3, the electronic device may display the target identifier on the taskbar of the device body, so as to more intuitively display the current remaining electric quantity of power supply of the detachable camera module to the user.

An embodiment of the present disclosure provides an electric quantity indicating method. On the one hand, since the first information includes the electric quantity information of the power supply of the detachable camera module, after the first electronic device receives the first information, the first electronic device can accurately indicate the electric quantity of the power supply of the detachable camera module based on the target identifier according to the first information, so that the usage of the power supply of the detachable camera module can be accurately monitored. On the other hand, since the first electronic device can receive in real time the first information sent by the detachable camera module, the first electronic device can monitor the usage of the power supply of the detachable camera module in real time, so as to effectively monitor in real time the power supply of the detachable camera module.

In the embodiments of the present disclosure, the target identifier may include a first sub-identifier and a second sub-identifier, the first sub-identifier may be an identifier of an installation state of the device body and the detachable camera module, and the second sub-identifier may be the electric quantity identifier of the power supply of the detachable camera module. In this way, the first electronic device can not only indicate the electric quantity information of the power supply of the detachable camera module through the target identifier, but also indicate the state of installation between the device body and the detachable camera module through the target identifier.

Figure 4:
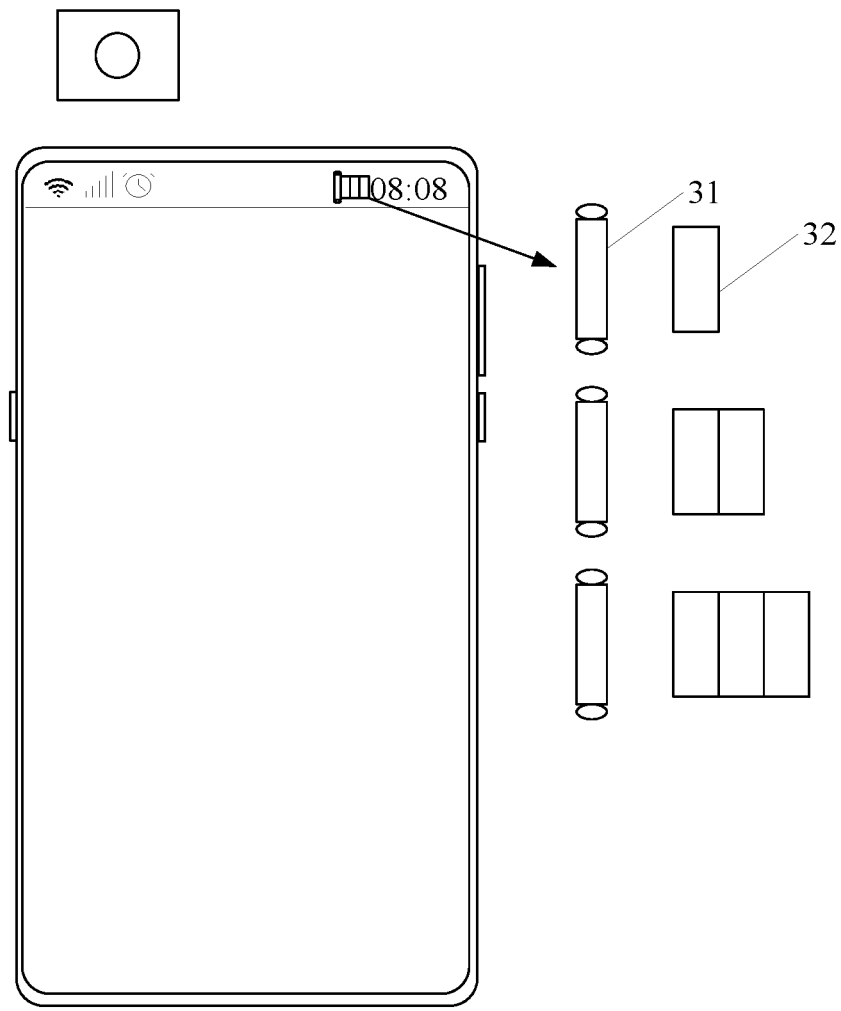
FIG. 4 is a schematic diagram 2 of an interface of the application of an electric quantity indicating method according to an embodiment of the present disclosure.

In the embodiments of the present disclosure, the first sub-identifier may be a film scroll identifier 31 shown in FIG. 4, and the second sub-identifier may be a film identifier 32 shown in FIG. 4.

In actual implementation, the first sub-identifier and second sub-identifier may also be any other possible identifiers, which may be determined according to actual usage requirements and are not limited in the embodiments of the present disclosure.

In the embodiments of the present disclosure, the first electronic device can detect the installation state of the device body of the first electronic device and the detachable camera module, and then the first electronic device can determine the first sub-identifier according to the installation state, so that the first electronic device can correspondingly display the first sub-identifier and the second sub-identifier. In this way, the installation state of the device body of the first electronic device and the detachable camera module can be clearly indicated to the user.

Exemplarily, the electric quantity indicating method provided by the embodiments of the present disclosure may further include the following S203 to S205.

S203: The first electronic device detects a target installation state of the device body and the detachable camera module.

S204: The first electronic device determines the first sub-identifier according to the target installation state.

S205: The first electronic device displays the first sub-identifier and the second sub-identifier.

In the embodiments of the present disclosure, the first electronic device can detect the target installation state of the device body of the first electronic device and the detachable camera module, so that the first electronic device can determine the first sub-identifier (the identifier of the installation state of the device body and the detachable camera module) according to the target installation state, and the first electronic device can display the first sub-identifier and the second sub-identifier according to an actual situation. Therefore, the displayed first sub-identifier and second sub-identifier can indicate the installation state of the device body and the detachable camera module, and indicate the electric quantity of the power supply of the detachable camera module.

It should be noted that, in the embodiments of the present disclosure, the installation state of the device body and the detachable camera module can be used to indicate whether the detachable camera module is installed in the device body.

In the embodiments of the present disclosure, the detachable camera module can be attached to the device body of the first electronic device through a magnet, or can be installed in the device body of the first electronic device through a connecting apparatus (such as a connecting rod). In some embodiments, this can be determined according to actual usage requirements and is not limited in the embodiments of the present disclosure.

In the embodiments of the present disclosure, since the first electronic device can display the first sub-identifier and the second sub-identifier according to the installation state of the detachable camera module on the first electronic device, the first electronic device can clearly and intuitively indicate the installation state of the detachable camera module on the first electronic device through the first sub-identifier and the second sub-identifier.

In the embodiments of the present disclosure, that the first electronic device determines the first sub-identifier according to the target installation state may be: the first electronic device determines a display mode of the first sub-identifier according to the target installation state.

It can be understood that different display modes of the first sub-identifier can identify different installation states of the device body and the detachable camera module.

In some embodiments, the first electronic device may determine display modes of the first sub-identifier and the second sub-identifier according to the target installation state.

In the embodiments of the present disclosure, target installation states are different, and the first electronic device may display the first sub-identifier and the second sub-identifier in different manners.

In some embodiments, the display modes of the first sub-identifier and the second sub-identifier may include two possible implementation manners, which are a first implementation manner and a second implementation manner respectively. The two implementation manners are exemplarily described below.

First implementation manner: when the target installation state is a first installation state, the first electronic device may display the first sub-identifier and the second sub-identifier in combination.

The first installation state may be a state in which the detachable camera module is installed in the device body.

It can be understood that the first installation state may indicate that the detachable camera module and the device body are combined into a whole.

In the embodiments of the present disclosure, in the first implementation manner, when the detachable camera module is installed in the device body, it is equivalent to that the detachable camera module and the device body form a whole. Therefore, the first electronic device can display the first sub-identifier and the second sub-identifier in combination, indicating that the detachable camera module is installed in the device body.

It should be noted that, in the embodiments of the present disclosure, the manner of "displaying" the first sub-identifier and the second sub-identifier in combination may be as follows: the first sub-identifier and the second sub-identifier are displayed in contact with each other, that is, there are no gaps (or slots) between the first sub-identifier and the second sub-identifier.

Exemplarily, assuming that the first sub-identifier is a film scroll identifier and the second sub-identifier is a film identifier, when the target installation state is the first installation state, as shown in FIG. 3, the first electronic device can display a film scroll identifier 31 and a film identifier 32 in combination.

In the embodiments of the present disclosure, since displaying the first sub-identifier and the second sub-identifier in combination can indicate that the first sub-identifier and the second sub-identifier form a whole, when the target installation state is the first installation state, the first electronic device can display the first sub-identifier and the second sub-identifier in combination to clearly indicate that the detachable camera module is currently installed in the device body. In this way, the first electronic device can indicate more information of the detachable camera module through the target identifier, so that the detachable camera module can be better monitored.

Second implementation manner: when the target installation state is a second installation state, the first electronic device displays the first sub-identifier and the second sub-identifier separately.

The second installation state may be used to indicate a state in which the detachable camera module is not installed in the device body and maintains a communication connection with the device body.

It should be noted that, in the embodiments of the present disclosure, since the detachable camera module has independent components such as a processor and a transceiver module, after the detachable camera module is detached from the device body of the first electronic device (that is, the detachable camera module is not installed in the device body), the detachable camera module can still maintain communication connection with the device body.

In the embodiments of the present disclosure, in the second implementation manner, when the detachable camera module is not installed in the device body and maintains a communication connection with the device body, it is equivalent to that the detachable camera module and the device body are separated into two parts. Therefore, the first electronic device can display the first sub-identifier and the second sub-identifier separately, indicating that the detachable camera module is not installed in the device body of the first electronic device.

Exemplarily, assuming that the first sub-identifier is a film scroll identifier and the second sub-identifier is a film identifier, when the target installation state is the second installation state, as shown in FIG. 4, the first electronic device can display a film scroll identifier 31 and a film identifier 32 separately.

In the embodiments of the present disclosure, since displaying the first sub-identifier and the second sub-identifier separately can indicate that the first sub-identifier and the second sub-identifier are two independent identifiers, when the target installation state is the second installation state, the first electronic device can display the first sub-identifier and the second sub-identifier separately to clearly indicate that the detachable camera module is currently not installed in the device body. In this way, the first electronic device can indicate more information of the detachable camera module through the target identifier, so that the detachable camera module can be better monitored.

In the embodiments of the present disclosure, when the target installation state is the second installation state, since the detachable camera module and the device body of the first electronic device maintain a communication connection, even if the detachable camera module is not installed in the device body, the detachable camera module can still send the first information to the first electronic device, so that the first electronic device can indicate the electric quantity of power supply of the detachable camera module through the target identifier.

In the embodiments of the present disclosure, the detachable camera module may establish and maintain a communication connection with the device body of the first electronic device through a Bluetooth module or near field communication (NFC).

In actual implementation, the detachable camera module can also establish/maintain a communication connection with the device body of the first electronic device in any other possible manner, which can be determined according to actual usage requirements and is not limited in the embodiment of the present disclosure.

It should be noted that, in the embodiments of the present disclosure, when the detachable camera module is installed in the device body of the first electronic device, the detachable camera module and the device body maintain a communication connection by default.

In the embodiments of the present disclosure, when the detachable camera module is disconnected from the main device of the first electronic device, the first electronic device can cancel the display of the target identifier on the device body, so as to inform the user that the detachable camera module and the first electronic device stop communication connection.

In the embodiments of the present disclosure, the detachable camera module has a sharing function. In a case that the detachable camera module is not installed in the device body of the first electronic device and maintains a communication connection with the device body, the detachable camera module can establish sharing connection with other electronic devices (for example, the second electronic device in the embodiments of the present disclosure). In this way, the electronic device can control the detachable camera module to perform related operations, such as capturing images.

In the embodiments of the present disclosure, when the detachable camera module is not installed in the device body and maintains a communication connection with the device body, the detachable camera module can detect whether the detachable camera module establishes sharing connection with other electronic devices. If the detachable camera module establishes sharing connection with an electronic device (for example, the second electronic device in the embodiments of the present disclosure), the detachable camera module can send information about sharing connection with the electronic device (for example, the second information in the embodiments of the present disclosure) to the first electronic device, to inform the first electronic device that the detachable camera module establishes sharing connection with other electronic devices. In this way, after the first electronic device receives the information, the first electronic device can display a sharing identifier, so that the state of the detachable camera module can be more clearly indicated to the user.

Exemplarily, the electric quantity indication method provided by the embodiments of the present disclosure may further include the following S206 and S207.

S206: When the detachable camera module is not installed in the device body and maintains a communication connection with the device body, the first electronic device receives the second information sent by the detachable camera module.

The second information may include information about sharing connection between the detachable camera module and the second electronic device. The second information may indicate that the detachable camera module establishes sharing connection with the second electronic device.

S207: The first electronic device displays the target identifier on the device body according to the second information.

The target identifier may include a sharing identifier.

It can be understood that the sharing identifier may be a part of the target identifier.

In the embodiments of the present disclosure, when the detachable camera module is not installed in the device body of the first electronic device and maintains a communication connection with the device body, the first electronic device can receive the second information, and after the first electronic device receives the second information, the first electronic device may display the sharing identifier on the device body, thereby indicating to the user that sharing connection is established between the detachable camera module and the second electronic device.

In the embodiments of the present disclosure, when the detachable camera module is not installed in the device body and maintains a communication connection with the main body of the device, the detachable camera module can detect in real time whether the detachable camera module establishes sharing connection with other electronic devices.

In some embodiments, if the detachable camera module detects that the detachable camera module has not established sharing connection with other electronic devices, the detachable camera module can continue to perform detection. If the detachable camera module detects that the detachable camera module establishes sharing connection with an electronic device (that is, the second electronic device), the detachable camera module can send the second information to the first electronic device.

In the embodiments of the present disclosure, the detachable camera module may establish sharing connection with the second electronic device through Bluetooth or NFC.

In the embodiments of the present disclosure, the first electronic device may control the detachable camera module to enable or disable the sharing function of the detachable camera module.

That is, when the detachable camera module is not installed in the device body of the first electronic device, the first electronic device can control whether the detachable camera module can establish sharing connection with other electronic devices.

Exemplarily, the first electronic device may be provided with a switch for controlling the sharing function of the detachable camera module. If the switch is turned on, the detachable camera module can establish sharing connection with other electronic devices when the detachable camera module is not installed in the device body; if the switch is turned off, the detachable camera module cannot establish sharing connection with other electronic devices when the detachable camera module is not installed in the device body.

In the embodiments of the present disclosure, the sharing identifier may be a character identifier or a graphic identifier, which may be determined according to actual usage requirements and is not limited in the embodiments of the present disclosure.

In the implementation of the present disclosure, the sharing identifier may be superimposed and displayed on the target identifier.

Figure 5:
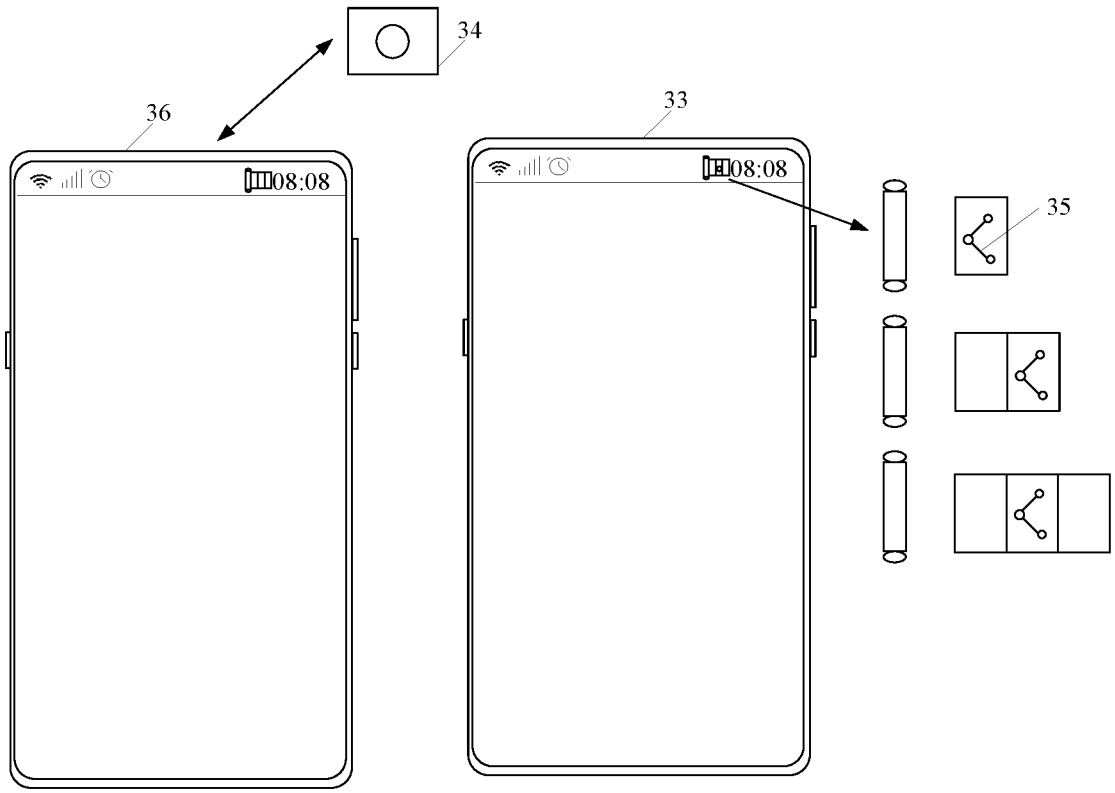
FIG. 5 is a schematic diagram 3 of an interface of the application of an electric quantity indicating method according to an embodiment of the present disclosure.

Exemplarily, as shown in FIG. 5, when the first electronic device 33 receives the second information sent by the detachable camera module 34, the first electronic device 33 can display the sharing identifier 35 on the target identifier, to indicate that the detachable camera module and the second electronic device 36 have established sharing connection.

In the embodiments of the present disclosure, on the one hand, after the detachable camera module establishes sharing connection with the second electronic device, the detachable camera module can feed back sharing connection information to the first electronic device, to improve the feedback mechanism of the detachable camera module. On the other hand, after the first electronic device receives the second information, by superimposing and displaying the sharing identifier on the target identifier, the first electronic device can clearly inform the user that the detachable camera module and other electronic devices have established sharing connection, so that the detachable camera module can be effectively monitored.

Figure 6:
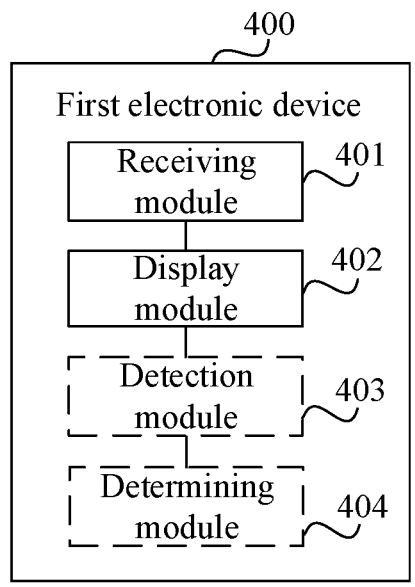
FIG. 6 is a schematic structural diagram of a first electronic device according to an embodiment of the present disclosure.

As shown in FIG. 6, an embodiment of the present disclosure provides a first electronic device 400. The first electronic device 400 includes a device body and a detachable camera module. The first electronic device 400 includes a receiving module 401 and a display module 402. The receiving module 401 is configured to receive first information sent by the detachable camera module, where the first information includes electric quantity information of the power supply of the detachable camera module; and the display module 402 is configured to: according to the first information received by the receiving module 401, display a target identifier on the device body; where the target identifier is an electric quantity identifier of the power supply of the detachable camera module in the first electronic device.

In the embodiments of the present disclosure, the target identifier includes a first sub-identifier and a second sub-identifier, the first sub-identifier is an identifier of an installation state of the device body and the detachable camera module, and the second sub-identifier is the electric quantity identifier of the power supply of the detachable camera module. As shown in FIG. 6, the first electronic device 400 further includes a detection module 403 and a determining module 404. The detection module 403 is configured to detect the target installation state of the device body and the detachable camera module; and the determining module 404 is configured to determine the first sub-identifier according to the target installation state detected by the detection module 403. The display module 402 is further configured to display the first sub-identifier and the second sub-identifier determined by the determining module 404.

In the embodiments of the present disclosure, the display module 402 is configured to: in a case that the target installation state is a first installation state, display the first sub-identifier and the second sub-identifier in combination, where the first installation state is a state in which the detachable camera module is installed in the device body; or the display module 402 is configured to: in a case that the target installation state is a second installation state, display the first sub-identifier and the second sub-identifier separately, where the second installation state is a state in which the detachable camera module is not installed in the device body and maintains communication connection with the device body.

In the embodiments of the present disclosure, the first sub-identifier is a scroll identifier, and the second sub-identifier is a film identifier.

In the embodiments of the present disclosure, the receiving module 401 is further configured to: in a case that the detachable camera module is not installed in the device body and maintains a communication connection with the device body, receive second information sent by the detachable camera module, where the second information includes information about sharing connection between the detachable camera module and a second electronic device; and the display module 402 is further configured to display the target identifier on the device body according to the second information received by the receiving module 401; where the target identifier includes a sharing identifier.

The first electronic device provided in the embodiments of the present disclosure can implement each process performed by the first electronic device in the above-mentioned embodiment of the electric quantity indicating method, and can achieve the same technical effect, which is not repeated herein to avoid repetition.

An embodiment of the present disclosure provides a first electronic device. On the one hand, since the first information includes the electric quantity information of the power supply of the detachable camera module, after the first electronic device receives the first information, the first electronic device can accurately indicate the electric quantity of the power supply of the detachable camera module based on the target identifier according to the first information, so that the usage of the power supply of the detachable camera module can be accurately monitored. On the other hand, since the first electronic device can receive in real time the first information sent by the detachable camera module, the first electronic device can monitor the usage of the power supply of the detachable camera module in real time, so as to effectively monitor in real time the power supply of the detachable camera module.

Figure 7:
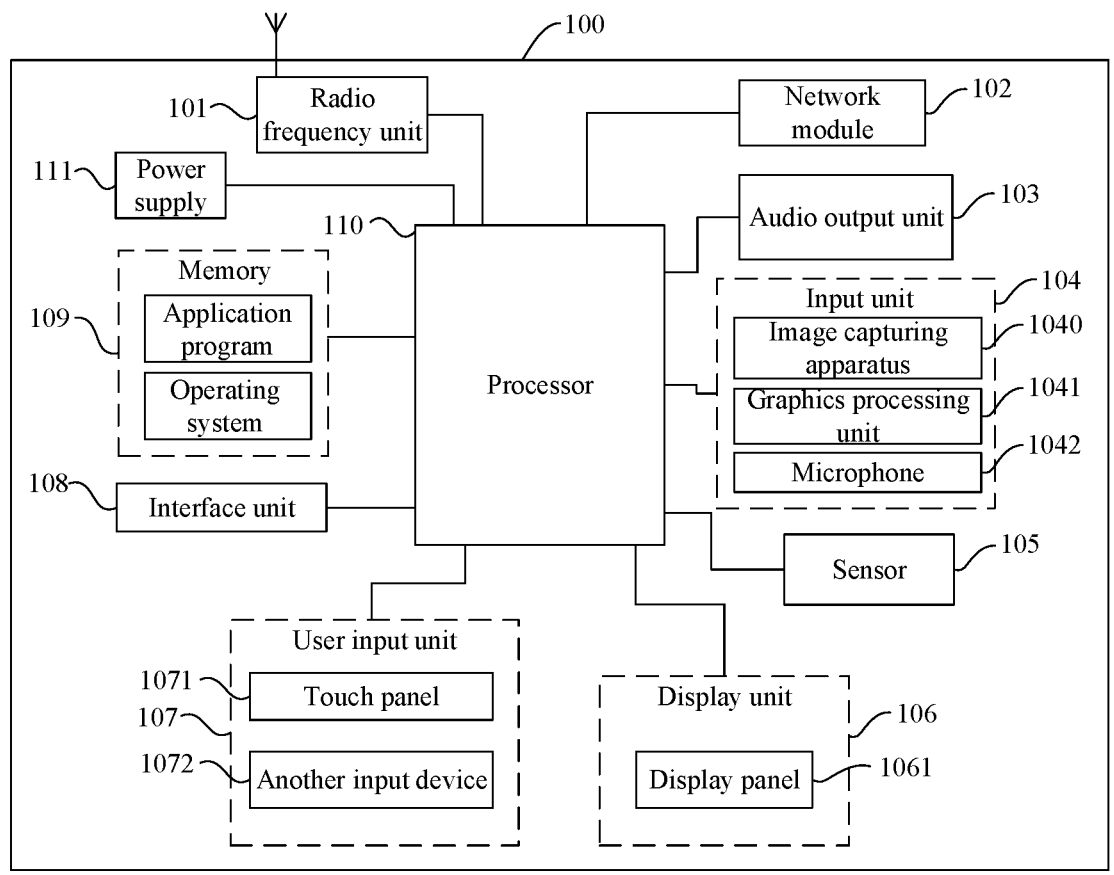
FIG. 7 is a schematic diagram of hardware of an electronic device according to an embodiment of the present disclosure.

FIG. 7 is a schematic diagram of hardware of an electronic device (the first electronic device in the embodiments of the present disclosure) implementing various embodiments of the present disclosure. As shown in FIG. 7, the first electronic device 100 includes but is not limited to: a radio frequency unit 101, a network module 102, an audio output unit 103, an input unit 104, a sensor 105, a display unit 106, a user input unit 107, an interface unit 108, a memory 109, a processor 110, a power supply 111, and other components. A person skilled in the art may understand that the structure of the first electronic device shown in FIG. 7 constitutes no limitation on the first electronic device. The first electronic device may include more or fewer components than those shown in the figure, or a combination of some components, or an arrangement of different components. In the embodiments of the present disclosure, the first electronic device includes but is not limited to a mobile phone, a tablet computer, a notebook computer, a palmtop computer, an in-vehicle terminal, a wearable device, a pedometer, and the like.

The first electronic device includes a device body and a detachable camera module. The radio frequency unit 101 may be configured to receive first information sent by the detachable camera module, where the first information includes electric quantity information of the power supply of the detachable camera module; and the display unit 106 is configured to: according to the first information received by the radio frequency unit 101, display a target identifier on the device body; where the target identifier is an electric quantity identifier of the power supply of the detachable camera module in the first electronic device.

It can be understood that, in the embodiments of the present disclosure, the receiving module 401 in the schematic structural diagram of the first electronic device (for example, FIG. 6) may be implemented by the radio frequency unit 101; the display module 402 in the schematic structural diagram of the first electronic device may be implemented by the display unit 106; the detection module 403 and the determining module 404 in the schematic structural diagram of the first electronic device can be implemented by the processor 110.

An embodiment of the present disclosure provides a first electronic device. On the one hand, since the first information includes the electric quantity information of the power supply of the detachable camera module, after the first electronic device receives the first information, the first electronic device can accurately indicate the electric quantity of the power supply of the detachable camera module based on the target identifier according to the first information, so that the usage of the power supply of the detachable camera module can be accurately monitored. On the other hand, since the first electronic device can receive in real time the first information sent by the detachable camera module, the first electronic device can monitor the usage of the power supply of the detachable camera module in real time, so as to effectively monitor in real time the power supply of the detachable camera module.

It should be understood that, in the embodiments of the present disclosure, the radio frequency unit 101 may be configured to receive and send information or receive and send a signal in a call process. In some embodiments, after downlink data from a base station is received, the processor 110 processes the downlink data. In addition, uplink data is sent to the base station. Usually, the radio frequency unit 101 includes but is not limited to an antenna, at least one amplifier, a transceiver, a coupler, a low noise amplifier, a duplexer, or the like. In addition, the radio frequency unit 101 may also communicate with a network and other devices through a wireless communication system.

The first electronic device provides wireless broadband Internet access for the user by using the network module 102, for example, helping the user to send and receive an e-mail, brows a web page, and access streaming media.

The audio output unit 103 may convert audio data received by the radio frequency unit 101 or the network module 102 or stored in the memory 109 into an audio signal and output the audio signal as a sound. Moreover, the audio output unit 103 can further provide audio output related to a specific function performed the first electronic device 100 (for example, call signal receiving sound and message receiving sound). The audio output unit 103 includes a speaker, a buzzer, a telephone receiver, and the like.

The input unit 104 is configured to receive audio or radio frequency signals. The input unit 104 may include an image capturing apparatus (for example, a camera) 1040, a Graphics Processing Unit (GPU) 1041, and a microphone 1042. The image capturing apparatus 1040 (such as a camera) captures image data of still images or videos. The graphics processing unit 1041 processes image data of a static picture or video obtained by the image capturing apparatus in a video capture mode or an image capture mode. A processed image frame may be displayed on the display unit 106. The image frame processed by the graphics processing unit 1041 may be stored in the memory 109 (or another storage medium) or sent by using the radio frequency unit 101 or the network module 102. The microphone 1042 may receive sound and can process such sound into audio data. The processed audio data may be converted in a call mode into a format that can be sent by the radio frequency unit 101 to a mobile communication base station for outputting.

The first electronic device 100 further includes at least one sensor 105, for example, a light sensor, a motion sensor, or another sensor. In some embodiments, the light sensor includes an ambient light sensor and a proximity sensor. The ambient light sensor may adjust luminance of a display panel 1061 according to ambient light luminance. The proximity sensor may switch off the display panel 1061 and/or backlight when the first electronic device 100 moves close to an ear. As a type of the motion sensor, an accelerometer sensor may detect an acceleration value in each direction (generally, three axes), and detect a value and a direction of gravity when the accelerometer sensor is static, and may be used in an application for recognizing a posture of the first electronic device (such as screen switching between landscape and portrait modes, a related game, or magnetometer posture calibration), a function related to vibration recognition (such as a pedometer or a knock), and the like. The sensor 105 may further include a fingerprint sensor, a pressure sensor, an iris sensor, a molecular sensor, a gyroscope, a barometer, a hygrometer, a thermometer, an infrared sensor, and the like. Details are not described herein.

The display unit 106 is configured to display information entered by the user or information provided for the user. The display unit 106 may include the display panel 1061, and the display panel 1061 may be configured in a form of a Liquid Crystal Display (LCD), an Organic Light-Emitting Diode (OLED), or the like.

The user input unit 107 can be configured to receive entered number or character information, and generate key signal input related to user settings and function control of the electronic device. In some embodiments, the user input unit 107 includes a touch panel 1071 and another input device 1072. The touch panel 1071, also referred to as a touchscreen, may collect a touch operation performed by the user on or near the touch panel 1071 (for example, an operation performed by the user on or near the touch panel 1071 by using any suitable object or accessory such as a finger or a stylus). The touch panel 1071 may include two parts: a touch detection apparatus and a touch controller. The touch detection device detects a touch position of the user, detects a signal brought by the touch operation, and sends the signal to the touch controller. The touch controller receives touch information from the touch detection device, converts the touch information into touch point coordinates, sends the touch point coordinates to the processor 110, and receives and executes a command sent by the processor 110. In addition, the touch panel 1071 may be implemented by using a plurality of types such as a resistive type, a capacitive type, an infrared ray, and a surface acoustic wave. The user input unit 107 may include another input device 1072 in addition to the touch panel 1071. In some embodiments, the other input devices 1072 may include but are not limited to: a physical keyboard, a function key (such as a volume control key, a switch key), a trackball, a mouse, and a joystick, which is no longer repeated here.

Further, the touch panel 1071 may cover the display panel 1061. After detecting the touch operation on or near the touch panel 1071, the touch panel transmits the touch operation to the processor 110 to determine a type of a touch event, and then the processor 110 provides corresponding visual output on the display panel 1061 based on the type of the touch event. Although in FIG. 7, the touch panel 1071 and the display panel 1061 are configured as two independent components to implement input and output functions of the first electronic device, in some embodiments, the touch panel 1071 and the display panel 1061 can be integrated to implement the input and output functions of the electronic device. Details are not limited herein.

The interface unit 108 is an interface for connecting an external apparatus and the first electronic device 100. For example, the external apparatus may include a wired or wireless headset jack, an external power supply (or a battery charger) port, a wired or wireless data port, a storage card port, a port for connecting an apparatus having an identification module, an audio input/output (I/O) port, a video I/O port, a headset jack, or the like. The interface unit 108 can be configured to receive input from an external apparatus (for example, data information and power) and transmit the received input to one or more elements in the first electronic device 100, or can be configured to transmit data between the first electronic device 100 and the external apparatus.

The memory 109 may be configured to store a software program and various data. The memory 109 may mainly include a program storage area and a data storage area. The program storage area may store an operating system, an application program required by at least one function (for example, a sound play function or an image display function), or the like. The data storage area may store data (for example, audio data or an address book) or the like created based on the use of a mobile phone. In addition, the memory 109 may include a high-speed random access memory or a nonvolatile memory, for example, at least one disk storage device, a flash memory, or other volatile solid-state storage devices.

The processor 110 is a control center of the first electronic device and connects all parts of the first electronic device using various interfaces and circuits. By running or executing software programs and/or modules stored in the memory 109 and by calling data stored in the memory 109, the processor implements various functions of the first electronic device and processes data, thus performing overall monitoring on the first electronic device. The processor 110 may include one or more processing units. In some embodiments, the processor 110 may be integrated with an application processor and a modem processor. The application processor mainly processes an operating system, a user interface, an application program, and the like, and the modem processor mainly processes wireless communication. It can be understood that, the modem processor may not be integrated into the processor 110.

The first electronic device 100 may further include the power supply 111 (such as a battery) supplying power to each component. In some embodiments, the power supply 111 may be logically connected to the processor 110 by using a power management system, so as to implement functions such as charging management, discharging management, and power consumption management by using the power management system.

In addition, the first electronic device 100 includes some functional modules not shown. Details are not described herein.

The embodiments of the present disclosure further provide a first electronic device, including a processor 110 shown in FIG. 7, a memory 109, and a computer program stored in the memory 109 and executable on the processor 110. When the computer program is executed by the processor 110, the processes of the foregoing embodiment of the electric quantity indication method are implemented, and a same technical effect can be achieved. To avoid repetition, details are not described herein again.

An embodiment of the present disclosure further provides a computer readable storage medium, where the computer readable storage medium stores a computer program, where the computer program, when executed by the processor 110 shown in FIG. 7, implements the processes of the foregoing embodiments of the electric quantity indication method, and the same technical effects can be achieved. To avoid repetition, details are not described herein again. The computer-readable storage medium may include a read-only memory (ROM), a random access memory (RAM), a magnetic disk, an optical disc, or the like.

An embodiment of the present disclosure further provides a computer program product. The computer program product is executed by at least one processor to implement the foregoing electric quantity indication method, and a same technical effect can be achieved. To avoid repetition, details are not described herein again.

An embodiment of the disclosure also provides an electronic device, configured to perform each process of the embodiment of the above electric quantity indicating method, and can achieve the same technical effect. To avoid repetition, details are not repeated herein.

It should be noted that, in this specification, the terms "include", "comprise", or any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. Without more restrictions, an element defined by the statement "including a . . . " does not exclude another same element in this process, method, article, or apparatus that includes the element.

Based on the foregoing descriptions of the embodiments, a person skilled in the art may clearly understand that the method in the foregoing embodiment may be implemented by software in addition to a necessary universal hardware platform or by hardware only. Based on such an understanding, the technical solutions of the present disclosure essentially or the part contributing to the prior art may be implemented in a form of a software product. The computer software product is stored in a storage medium (such as a ROM/RAM, a magnetic disk, or an optical disc), and includes several instructions for instructing an electronic device (which may be a mobile phone, a computer, a server, an air conditioner, a network device, or the like) to perform the method described in the embodiments of the present disclosure.

The embodiments of the present disclosure are described above with reference to the accompanying drawings, but the present disclosure is not limited to the foregoing specific implementations, and the foregoing specific implementations are only illustrative and not restrictive. Under the enlightenment of the present disclosure, a person of ordinary skill in the art can make many forms without departing from the purpose of the present disclosure and the protection scope of the claims, and all of these fall within the protection of the present disclosure.

The invention claimed is:

1. An electric quantity indicating method, performed by an electronic device, wherein the electronic device comprises a device body and a detachable camera module, and the method comprises:
   receiving first information sent by the detachable camera module, wherein the first information comprises electric quantity information of a power supply of the detachable camera module;
   detecting a target installation state of the device body and the detachable camera module, wherein the target installation state includes a first installation state and a second installation state, the first installation state is a state in which the detachable camera module is installed in the device body, and the second installation state is a state in which the detachable camera module is not installed in the device body and maintaining a communication connection with the device body; and displaying a target identifier on the device body according to the first information and the target installation state, wherein the target identifier comprises an identifier of an installation state of the device body and the detachable camera module and an electric quantity identifier of the power supply of the detachable camera module in the electronic device that together identify the target installation state.

2. The electric quantity indicating method according to claim 1, wherein the target identifier further comprises:
a first sub-identifier; and
a second sub-identifier that is the electric quantity identifier of the power supply of the detachable camera module in the electronic device.

3. The electric quantity indicating method according to claim 2, wherein displaying the target identifier comprises:
when the target installation state is the first installation state, displaying the first sub-identifier and the second sub-identifier in combination; and
when the target installation state is the second installation state, displaying the first sub-identifier and the second sub-identifier separately.

4. The electric quantity indicating method according to claim 2, wherein the first sub-identifier is a scroll identifier, and the second sub-identifier is a film identifier.

5. The electric quantity indicating method according to claim 1, wherein the method further comprises:
when the detachable camera module is not installed in the device body and maintains a communication connection with the device body, receiving second information sent by the detachable camera module, wherein the second information comprises information about shared connection information between the detachable camera module and a second electronic device; and
displaying the target identifier on the device body according to the second information,
wherein the target identifier comprises a sharing identifier.

6. An electronic device, comprising:
a device body;
a detachable camera module;
a memory storing a computer program; and
a processor coupled to the memory and configured to execute the computer program to perform operations comprising:
receiving first information sent by the detachable camera module, wherein the first information comprises electric quantity information of a power supply of the detachable camera module;
detecting a target installation state of the device body and the detachable camera module, wherein the target installation state includes a first installation state and a second installation state, the first installation state is a state in which the detachable camera module is installed in the device body, and the second installation state is a state in which the detachable camera module is not installed in the device body and maintaining communication connection with the device body; and
displaying a target identifier on the device body according to the first information and the target installation state, wherein the target identifier comprises an identifier of an installation state of the device body and the detachable camera module and an electric quantity identifier of the power supply of the detachable camera module in the first electronic device that together identify the target installation state.

7. The electronic device according to claim 6, wherein the target identifier further comprises:
a first sub-identifier; and
a second sub-identifier that is the electric quantity identifier of the power supply of the detachable camera module in the electronic device.

8. The electronic device according to claim 7, wherein displaying the target identifier comprises:
when the target installation state is the first installation state, displaying the first sub-identifier and the second sub-identifier in combination; and
when the target installation state is the second installation state, displaying the first sub-identifier and the second sub-identifier separately.

9. The electronic device according to claim 7, wherein the first sub-identifier is a scroll identifier, and the second sub-identifier is a film identifier.

10. The electronic device according to claim 6, wherein the operations further comprise:
when the detachable camera module is not installed in the device body and maintains a communication connection with the device body, receiving second information sent by the detachable camera module, wherein the second information comprises information about shared connection information between the detachable camera module and a second electronic device; and
displaying the target identifier on the device body according to the second information,
wherein the target identifier comprises a sharing identifier.

11. A non-transitory computer-readable storage medium, storing a computer program, wherein the computer program, when executed by a processor of an electronic device having a device body and a detachable camera module, causes the processor to perform operations comprising:
receiving first information sent by the detachable camera module, wherein the first information comprises electric quantity information of a power supply of the detachable camera module;
detecting a target installation state of the device body and the detachable camera module, wherein the target installation state includes a first installation state and a second installation state, the first installation state is a state in which the detachable camera module is installed in the device body, and the second installation state is a state in which the detachable camera module is not installed in the device body and maintaining communication connection with the device body; and
displaying a target identifier on the device body according to the first information and the target installation state, wherein the target identifier comprises an identifier of an installation state of the device body and the detachable camera module and an electric quantity identifier of the power supply of the detachable camera module in the first electronic device that together identify the target installation state.

12. The non-transitory computer-readable storage medium according to claim 11, wherein the target identifier further comprises:
a first sub-identifier; and
a second sub-identifier that is the electric quantity identifier of the power supply of the detachable camera module in the electronic device.

13. The non-transitory computer-readable storage medium according to claim 12, wherein displaying the target identifier comprises:
- when the target installation state is the first installation state, displaying the first sub-identifier and the second sub-identifier in combination; and
- when the target installation state is the second installation state, displaying the first sub-identifier and the second sub-identifier separately.

14. The non-transitory computer-readable storage medium according to claim 12, wherein the first sub-identifier is a scroll identifier, and the second sub-identifier is a film identifier.

15. The non-transitory computer-readable storage medium according to claim 11, wherein the operations further comprise:
- when the detachable camera module is not installed in the device body and maintains a communication connection with the device body, receiving second information sent by the detachable camera module, wherein the second information comprises information about shared connection information between the detachable camera module and a second electronic device; and
- displaying the target identifier on the device body according to the second information,
- wherein the target identifier comprises a sharing identifier.

* * * * *